United States Patent [19]
Johnson

[11] 3,896,436
[45] July 22, 1975

[54] DOPPLER RADAR RECEIVER

[75] Inventor: Gerald Frederic Johnson, Malvern, England

[73] Assignee: Minister of Aviation, in Her Majesty's Government of the United Kingdom of Great Britain & Northern Ireland, London, England

[22] Filed: Nov. 20, 1962

[21] Appl. No.: 239,095

[30] Foreign Application Priority Data
Nov. 27, 1961 United Kingdom............... 42401/61

[52] U.S. Cl........................ 343/16 M; 343/8; 343/9
[51] Int. Cl............................ G01s 9/44; G01s 9/22
[58] Field of Search ........................ 343/7.7, 8, 9, 16

[56] References Cited
UNITED STATES PATENTS
3,003,147  10/1961  Lueg...................................... 343/8
3,092,832  6/1963   Schiffman............................... 343/8

Primary Examiner—Maynard R. Wilbur
Assistant Examiner—G. E. Montone
Attorney, Agent, or Firm—Cushman, Darby & Cushman

EXEMPLARY CLAIM

1. A Doppler radar system, wherein a phase-sensitive detector demodulates a Doppler signal derived from an incoming signal from a moving target, the detector using a reference signal of the same frequency as the Doppler signal, comprising
a transmitter,
a phase sensitive detector for demodulating a Doppler signal,
two coherent incoming signal detectors each fed with reference signal from the transmitter and via divided paths with the same reflected incoming signals from a target,
two Doppler signal feed paths, one feeding a Doppler signal from one coherent detector to the signal input of the phase sensitive detector and the other feeding a Doppler signal from the other coherent detector to the reference input of the phase sensitive detector,
phase shift means connected in the incoming signal path to one of the coherent detectors for introducing a quadrature phase shift between the two incoming signals applied to the coherent detectors and,
further phase shift means connected in one of the feedpaths to the phase sensitive detector for introducing a further quadrature phase shift between the Doppler signals fed to the phase sensitive detector, whereby
unwanted Doppler frequency double sideband signals in the outputs of the coherent detectors due to noise modulated transmitter signals mixed with the incoming signals result in opposing signals in the output of the phase sensitive detector.

15 Claims, 8 Drawing Figures

DOPPLER RADAR RECEIVER

This invention relates to Doppler radar systems and is concerned with reducing unwanted noise signals resulting from spurious amplitude and frequency modulation of transmitted signals in a radar system.

In Doppler radar systems a signal transmitted from a transmitter is received as a signal reflected from a target and, if the target is moving radially, a corresponding, and so-called Doppler, frequency shift appears in the reflected signal; this frequency shift, as is well known, is determined by the radial velocity of the target, the frequency of the received signal being above or below the transmission frequency accordingly as the radial velocity is towards or away from the radar system.

In a Doppler radar system the Doppler shift frequency of a received signal is detected by applying the signal to a coherent detector. This detector uses the transmitted signal as a reference signal and thus a moving target may be detected and its velocity determined. The coherent detector may operate at signal transmission frequency or, of course, at a convenient Intermediate Frequency (IF) to give a Doppler frequency output signal, referred to henceforth for brevity as a Doppler signal.

For many applications an output which is of the zero frequency type from the Doppler point of view is useful, and to obtain this the Doppler signal from the coherent detector is applied to a phase sensitive detector switched at the Doppler frequency; an output signal is obtained whose polarity corresponds to the sense of the Doppler frequency shift.

Doppler signals may be at the actual Doppler frequency or arrangements may be made to translate them to one predetermined frequency convenient for processing purposes, by means of the so-called "speedgate" arrangement for example. A speedgate arrangement employs a variable oscillator, the speedgate oscillator, the output of which is mixed with the Doppler frequency signal in the speedgate mixer, and applied to a narrow-band amplifier known as a speedgate amplifier. Thus it is possible to bring any Doppler frequency signal to one predetermined frequency which is the frequency of the narrow-band, speedgate amplifier. The setting of the speedgate oscillator then gives the value of the Doppler frequency and hence the radial velocity of the target, and succeeding Doppler signal circuits (e.g. circuits for extracting directional information from the Doppler signal) operate very conveniently and simply at the predetermined, speedgate frequency. Speedgate arrangements will be described later in this Specification.

Angular information about a target may be derived in a number of conventional ways, using conical aerial scanning patterns, for example, or techniques of the class known as "static-split" in which angular information about the target in desired planes is obtained from sum and difference signals derived from appropriately disposed multi-horn aerials. Where the angular information is utilised to control aerial tracking systems, the output signal is again a zero-frequency signal whose phase and amplitude indicates angular misalignment.

In Doppler radar systems, interfering signals are liable to affect target detection and tracking performance; this is particularly so as far as angular information is concerned. Examples of interfering signals are noise, clutter due to returns from nearby objects, amplitude and frequency modulated noise produced by unauthorised sources within the radar system receiver, and board-band jamming signals.

It is an object of the present invention to provide means for reducing the effects of interfering signals in Doppler radar systems.

According to the invention, there is provided a Doppler radar system, wherein a phase-sensitive detector demodulates a Doppler signal derived from an incoming signal from a moving target, the detector using a reference signal of the same frequency as the Doppler signal, comprising, a transmitter, a phase sensitive detector for demodulating a Doppler signal, two coherent incoming signal detectors each fed with reference signal from the transmitter and via divided paths with the same reflected incoming signals from a target, two Doppler signal feedpaths, one feeding a Doppler signal from one coherent detector to the signal input of the phase sensitive detector and the other feeding a Doppler signal from the other coherent detector to the reference input of the phase sensitive detector, phase shift means connected in the incoming signal path to one of the coherent detectors for introducing a quadrature phase shift between the two incoming signals applied to the coherent detectors and, further phase shift means connected in one of the feedpaths to the phase sensitive detector for introducing a further quadrature phase shift between the Doppler signals fed to the phase sensitive detector, whereby unwanted Doppler frequency double sideband signals in the outputs of the coherent detectors due to noise modulated transmitter signals mixed with the incoming signals result in opposing signals in the output of the phase sensitive detector.

Accordingly the invention also provides a Doppler radar system of the kind in which a phase sensitive detector demodulates a Doppler signal using a reference signal at the same frequency as the Doppler signal, the Doppler and reference signals being obtained from two matched coherent detectors which detect incoming signals from a moving target the coherent detectors using the radar system transmitter signal as a reference signal, wherein phase shift means introduces a quadrature phase shift between the incoming signals to the two coherent detectors, and further phase shift means introduces a further quadrature phase shift between the Doppler signal and the reference signal applied to the phase sensitive detector, whereby signal in the output of the phase sensitive detector due to unwanted double sideband incoming signals caused by noise modulation of reflected transmitter power oppose each other.

The invention comprises a Doppler radar system of the kind in which a coherent detector detects a Doppler signal from an incoming signal reflected by a moving target, the detector deriving its reference signal from the radar transmitter, and a phase sensitive detector demodulates the Doppler signal, its reference signal being of the same frequency as the Doppler signal and being obtained from the incoming signal by a second coherent detector having the same reference signal as the first coherent detector, wherein phase shift means introduces a quadrature phase shift between the incoming signals applied to the two coherent detectors and further phase shift means introduces a further quadrature phase shift between the two Doppler frequency signals applied as Doppler signal and reference signal to the phase sensitive detector.

In order to make the invention clearer, examples of continuous wave (CW) radar systems according to the invention will now be described, reference being made to the drawings accompanying this Specification in which:

FIG. 3 shows schematically an addition to the system of

FIG. 2 which has application in CW velocity tracking radar systems; and

Figure 1:
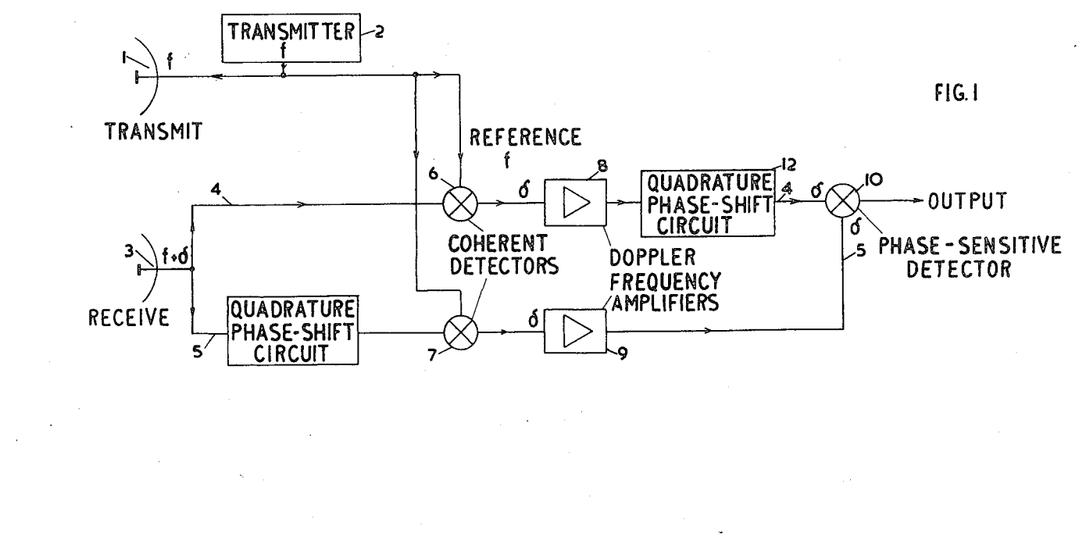
FIG. 1 shows schematically a simple Doppler radar system according to the invention.

In FIG. 1 a transmitting aerial 1 is fed from a C.W. transmitter 2. A receiving aerial 3 feeds to a pair of channels 4 and 5 which contain coherent detectors 6 and 7 and balanced amplifiers 8 and 9. Channel 4 after the amplifier 8 constitutes the Doppler signal input of a phase-sensitive detector 10 and channel 5 after the amplifier 9 is the reference signal source for the detector 10. A quadrature phase shift circuit 11 is connected in the channel 5 on the aerial side of the coherent detector 7 and a further quadrature phase shift circuit 12 is connected in the channel 4 between the amplifier 8 and the phase-sensitive detector 10; apart from these phase-shift circuits 11 and 12, the channels 4 and 5 are balanced so that they are as nearly electrically identical as possible, in particular having identical phase characteristics.

In operation, a C.W. signal at frequency f and derived from the C.W. transmitter 2 is radiated from the transmitting aerial 1. A reflected signal at a frequency, $f+\delta$, from a moving target is received at the receiving aerial 3, the incremental frequency change $\delta$ being the Doppler frequency shift due to movement of the target.

The receiving aerial 3 feeds to the coherent detectors 6 and 7 in the channels 4 and 5 respectively. Unwanted signals resulting from frequency or amplitude modulated reflections of the transmission result in signals from the detectors 6 and 7 which are in phase or in antiphase (or of zero amplitude) but have generally different amplitudes; these amplitudes depend upon the phases of the signals relative to the reference signal.

The Doppler signal outputs of the two mixers 6 and 7 pass, via the amplifiers 8, 9, to the phase-sensitive detector 10. The channel 4 which includes the quadrature phase shift circuit 12 provides the signal for the detector 10 and the channel 5 the reference signal. The phase-sensitive detector 10 then gives an output indicating the existence of a reflected signal from a moving target at the receiving aerial 3.

At the same time the presence of the further quadrature phase shift circuit 12 has ensured that those parts of the outputs of the detectors 6 and 7 corresponding to unwanted frequency and amplitude modulation of the transmitted signal are so phased at the phase-sensitive detector 10 relative to the reference signal of the channel 5 that there is no resultant output and a measure of noise reduction is achieved. This reduction does not depend upon the accuracy of the first phase shift carried out in the quadrature circuit 11.

Figure 2:
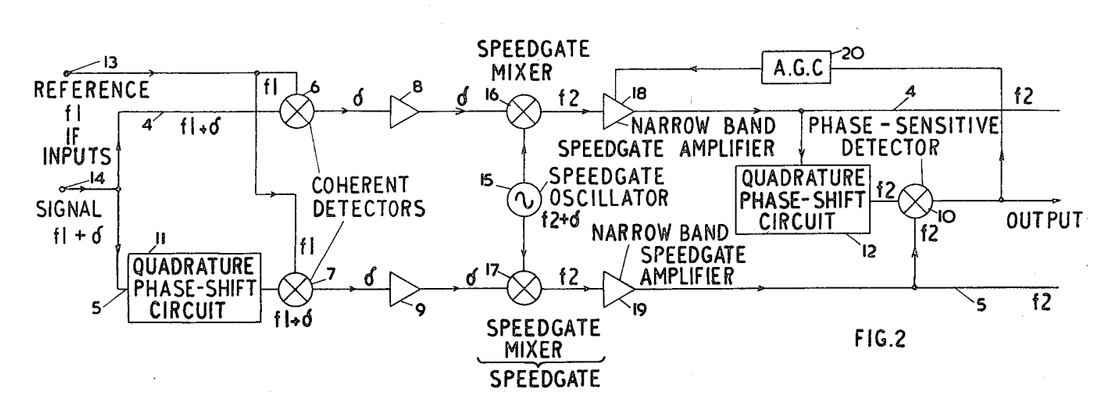
FIG. 2 shows schematically the relevant parts of a more complicated Doppler radar system according to the invention utilising Doppler signal selection of the speedgate type.

The relevant parts of a more complicated C.W. Doppler receiver are shown in FIG. 2, where it is to be understood that the incoming reference and signal inputs are obtained from a receiver conveniently arranged to give reference and signal outputs at intermediate frequency $f1$ (I.F.). An IF reference input, $f1$, is indicated at 13 and an IF signal input $f1+\delta$ at 14. The arrangement here, apart from being an IF arrangement, is basically similar to that of the corresponding part of FIG. 1, and balanced signal channels 4 and 5 are again identified as feeding to coherent detectors 6, and 7. A speedgate Doppler frequency selection arrangement is inserted following the Doppler frequency amplifier 8 and 9, and consists of a speedgate oscillator 15 and speedgate mixers 16 and 17 followed by speedgate narrow-band amplifiers 18 and 19 respectively. The speedgate arrangement is followed by the phase-sensitive detector 10 which is basically the same as that shown in FIG. 1 except that in this instance it operates at speedgate selection frequency $f2$.

In operation the speedgate functions in known manner to select a given Doppler frequency signal and to convert it to speedgate frequency $f2$ (e.g. $f2=100$ kc/s). The narrow-band speedgate amplifiers 18 and 19 accept the converted Doppler signal $f2$ and pass it to the phase-sensitive detector 10. Thus Doppler signals at the discrete frequency corresponding to a given target velocity may be selected at will by adjustment of the frequency of the speedgate oscillator; the advantage is that apart from the oscillator no variable frequency circuits are required.

The phase characteristics of the two channels 4 and 5 are matched, apart from the two quadrature phase shift circuits 11 and 12. The circuit 11 causes a quadrature phase shift between the two inputs, $f1+\delta$, to the two mixers 6 and 7 and hence between the Doppler frequency outputs fed to the amplifiers 8 and 9. It is now noted that the sense of this phase difference depends upon the sense of the Doppler frequency shift either to raise the frequency of the reflected signal or to lower it. Then, following the action of the further quadrature phase shift circuit 12 the Doppler signal applied to the phase sensitive detector 10 is either restored in phase or made to be in antiphase relative to the original phase relationship with the reference signals, and the output of the detector 10 is accordingly of one sign or the other to indicate the sense of the Doppler frequency shift. The actual sense depends of course upon the initial setting of the phase of the reference signal and may be related to the radial direction of the target to conform with any preferred convention.

The Doppler signal is, so-to-speak, only a single sideband signal, that is the Doppler shift either raises or lowers the frequency of the reflected signal; the Doppler receiver arrangement accordingly deals with shifts of each sense about the transmitted frequency. Unfortunately, in Doppler systems of the kind we are concerned with, noise clutter, causing amplitude or frequency modulation of reflected transmitted power, is received as unwanted signals appearing in mirror-image side-bands about the transmitted frequency. Due, however, to the quadrature phase shifts of the circuits 11 and 12, amplitude and frequency modulation noise clutter gives rise to equal signals of opposite polarity in the output of the phase sensitive detector 10 and these signals tend to cancel. This results in reduction of the adverse effect of amplitude and frequency modulation noise clutter.

Improved performance may be expected where incoming signals are contaminated by any of the following:
a. clutter returns;
b. amplitude modulated clutter produced by pulse gating of a C.W. Doppler receiver;
c. broadband jamming;
d. spurious amplitude and frequency modulation occurring within the receiver.

Additionally, the adverse effect of interference picked up in the two channels 4 and 5 between the phase shift circuits 11 and 12 is reduced.

Figure 5:
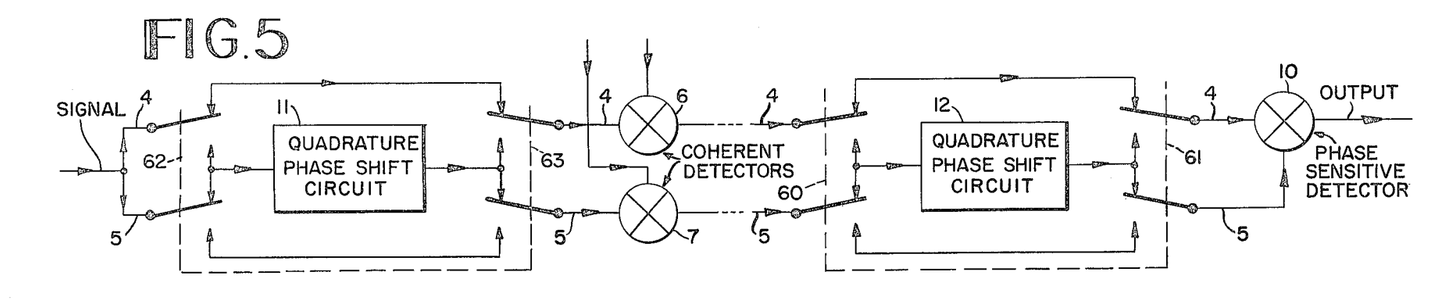
FIGS. 5, 6, 7 and 8 show schematically modifications of a Doppler radar system according to the invention.

The phase shift circuits 11 and 12 are inserted in whichever channels are convenient to give a desired Doppler shift sensing convention. One arrangement which has advantage in practice involves the insertion of one of the quadrature phase shift circuits in one channel and the provision of switching enabling the other phase shift circuit to be inserted in one channel or the other at choice, according to the sense of radial movement of a wanted target. This arrangement is illustrated in FIG. 5 wherein the quadrature phase shift circuit 12 may be connected into either the channel 4 or the channel 5 by means of reversing switches 60, 61. Similarly the quadrature phase shift circuit 11 may be connected into either the channel 4 or the channel 5 by means of reversing switches 62, 63. The switches 60, 61 may be mechanically connected together and so may the switches 62 and 63.

A refinement is the connection of an AGC circuit 20 between the output of the phase sensitive detector 10 and the narrow-band speedgate amplifier 18 of the channel 4. This assists in preserving the overall sensitivity of the system even though the signal-to-noise ratios in the narrow-band amplifiers 18, 19 are less than unity. A limit to this is set by the dynamic range of the phase-sensitive detector 10.

The C.W. Doppler radar system described simply above enables a reflected C.W. signal to be detected to indicate whether a target is present or not; it can also indicate target velocity and whether approaching or receding. Another function for which C.W. systems are very suitable is to provide means for target tracking, so that the radar aerial, for example, may be maintained pointing in the direction of the target.

An improved C.W. Doppler radar system of the kind described in the above paragraphs may conveniently form the basis for a radar giving directional information about a target in which a conically-scanning aerial is employed in conjunction with suitable additional circuits for extracting the directional information from the resulting modulated reflected target signal. Use of the invention in such a directional system follows directly and simply along conventional known lines and for reasons of brevity will not be referred to at length in this specification.

Figure 3:
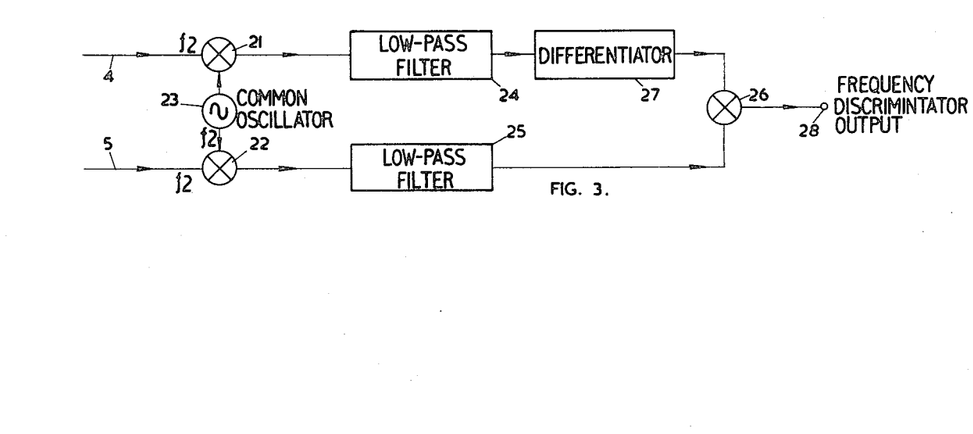

For use in tracking radar systems however the system of FIG. 2 is advantageously extended by an addition to it as shown in FIG. 3. The channels 4 and 5 of FIG. 2 are continued in FIG. 3 and feed respectively to two mixers 21 and 22 which are supplied with a reference oscillation from a common oscillator 23. The oscillator 23 operates at the centre-frequency $f2$ of the pass-band of the narrow-band speedgate amplifiers 18 and 19 of FIG. 2. Outputs from the mixers 21, 22 are fed via low pass-filters 24, 25 to a second phase sensitive detector 26, the channel 4 including a differentiator 27. The output of the detector 26 is designated a frequency discriminator output 28, and may be used in known manner to control the speedgate oscillator 15 to track the target in velocity.

If a velocity error exists, then there will be beat-frequency outputs from the mixers 21, 22. These outputs pass via the low pass filters and in one case via the differentiator 27, providing incidentally the further quadrature shift, to the detector 26. The output of the detector 26 is a d.c. signal proportional to the velocity error, its sign indicating whether this error velocity is above or below the speedgate velocity. The use of the additional mixers 21, 22 confers the property that there is a minimum unwanted signal at the output due to unwanted signals caused by reflections of transmitted power, amplitude or frequency modulated at any frequency within the Doppler frequency pass band of the receiver. In other words the arrangement ensures that there is no signal at the output 28 of the frequency discriminator due to clutter modulation occurring at any frequency in the speedgate bandwidth.

In a C.W. Doppler radar system where directional information about targets is obtained using scanning methods, a further refinement which could reduce the effects of clutter is to make the aerial system symmetrical about its scanning axis.

In a C.W. Doppler radar system employing static split technique for obtaining directional information about a target, an aerial system is used in which the receiving element consists of a four-horn cluster. Signals obtained from the four-horns are processed as follows:
a. they are added to provide a large signal for showing that a target exists;
b. the signals from two of the horns in one plane, say the azimuth plane, are subtracted to give a signal indicating that the target signal is stronger in one horn than the other i.e. the target is to one side of the aerial axis;
c. the signals from two horns in an orthogonal plane, the elevation plane, are subtracted to give a signal indicating that the target signal is stronger in one horn than the other i.e. the target is above or below the aerial axis.

Thus the signals indicating the degree of misalignment in elevation and in azimuth are obtained, and may be applied in known manner to control aerial elevation and azimuth servo systems and keep the aerial directed at the target. It will be appreciated that any interfering signals which cause spurious output signals to be applied to the servo systems are a source of error and may even prevent automatic control i.e. target tracking, from being satisfactorily achieved.

Figure 4:
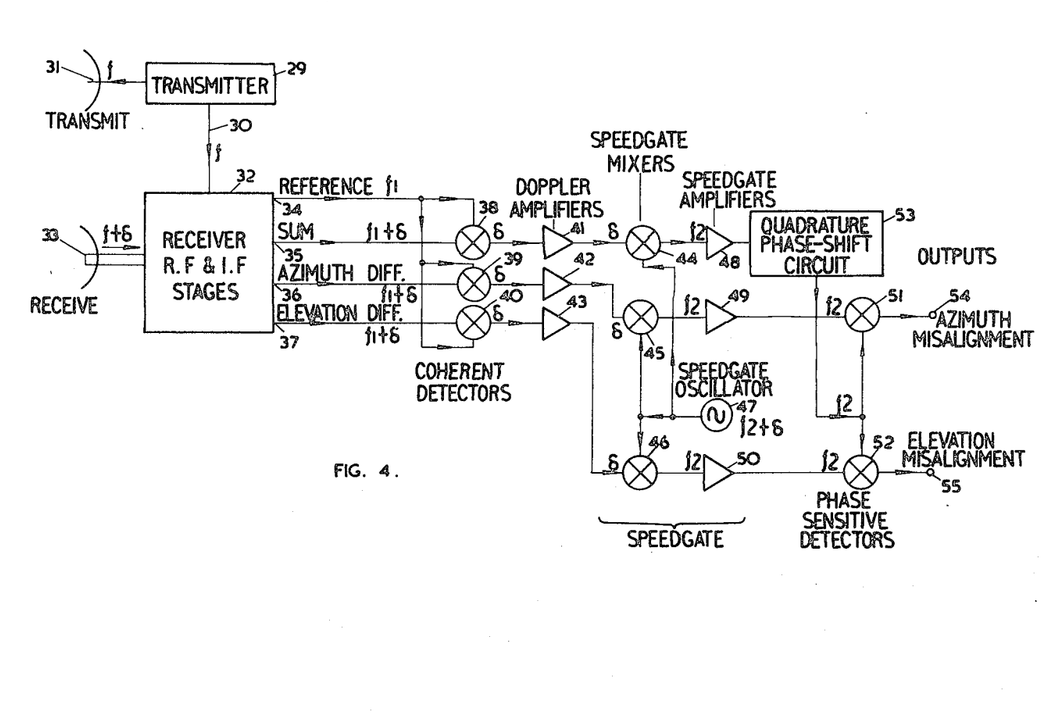
FIG. 4 shows schematically the relevant parts of a CW angle tracking radar system according to the invention in which static split technique is employed.

This error can be overcome to a useful extent by applying the principle of the invention to a static split system and FIG. 4 shows how this is done.

A transmitter 29 feeds a signal of frequency $f$ to a transmitting aerial 31 and provides a reference signal $f$ via a line 30 to the RF (radio frequency) and IF stages of a receiver 32; receiving aerial 33 comprising a four horn cluster feeds the receiver 32.

The receiver 32 has outputs 34-37 at IF frequency as follows:

Output 34 reference signal at frequency $f1$;

Output 35 sum of all horns of aerial 33 at frequency, $f1+\delta$,
i.e. transmitted frequency with added Doppler shift due to moving reflecting target;

Output 36 difference of two horns in azimuth plane at frequency $f1+\delta$;

Output 37 difference of two horns in elevation plane at frequency $f1+\delta$.

The outputs 35, 36 and 37 are applied to IF coherent detectors 38, 39 and 40 respectively, the reference output 34 supplying the reference signal for the detectors 38, 39 and 40. Doppler signal amplifiers 41, 42 and 43 follow the detectors 38, 39 and 40 and feed to a speedgate arrangement consisting of speedgate signal mixers, sum 44, azimuth difference 45, and elevation difference 46, a common speedgate oscillator 47 (frequency $f2+\delta$) and, speedgate sum and two difference amplifiers 48, 49 and 50. The azimuth and elevation difference speedgate amplifiers 49 and 50 are connected to the signal inputs of phase-sensitive detectors 51 and 52 respectively and the sum speedgate amplifier 48 is connected via a quadrature phase-shift circuit 53 as a reference signal source for the detectors 51 and 52.

The receiver 32 includes a quadrature phase-shift circuit which ensures that the sum signal is in quadrature with the azimuth and elevation difference signals and, apart from this and the phase-shift circuit 53, the sum, azimuth difference and elevation difference circuits are phase equalised from the receiver aerial 33 to the phase-sensitive detectors 51 and 52. The gains of the two difference signal paths are kept equal up to the detector 51 and 52.

Typically the transmission frequency $f$ is of the order of 10 kMc/s and the Doppler frequency ranges between say 3 and 60 kc/s. The speedgate operates at a frequency $f2$ of 100 kc/s and has a bandwidth of 180 c/s. Further refinements are possible, for instance the provision of A.G.C. (automatic gain control) for the speedgate amplifiers 48, 49 and 50 by means of the sum channel signal from the amplifier 48 or by a further elaboration of the sum channel in the manner described above in relation to FIG. 2. Additionally a limiter may be provided in the reference signal feed to the phase-sensitive detectors 51 and 52 from the phase-shift circuit 53. The limiter, operating at 100 kc/s in the present example, is made regenerative to ensure constant amplitude for the reference signal, irrespective of breaks in the input signals, and so to avoid spurious outputs at the phase sensitive detector. This is shown schematically in FIG. 6 wherein a regenerative limiter 64 is provided in the output channel of the quadrature phase shifter 53.

The arrangement thus described represents a C.W. Doppler radar system for giving target misalignment information, and it can be seen that the two quadrature phase-shifts of the invention are present; consequently, in operation, reduction of noise clutter will be possible to give increased accuracy of the azimuth and elevation misalignment signals available at the output terminals 54 and 55 respectively of the detectors 51 and 52.

Figures 6, 7, 8:
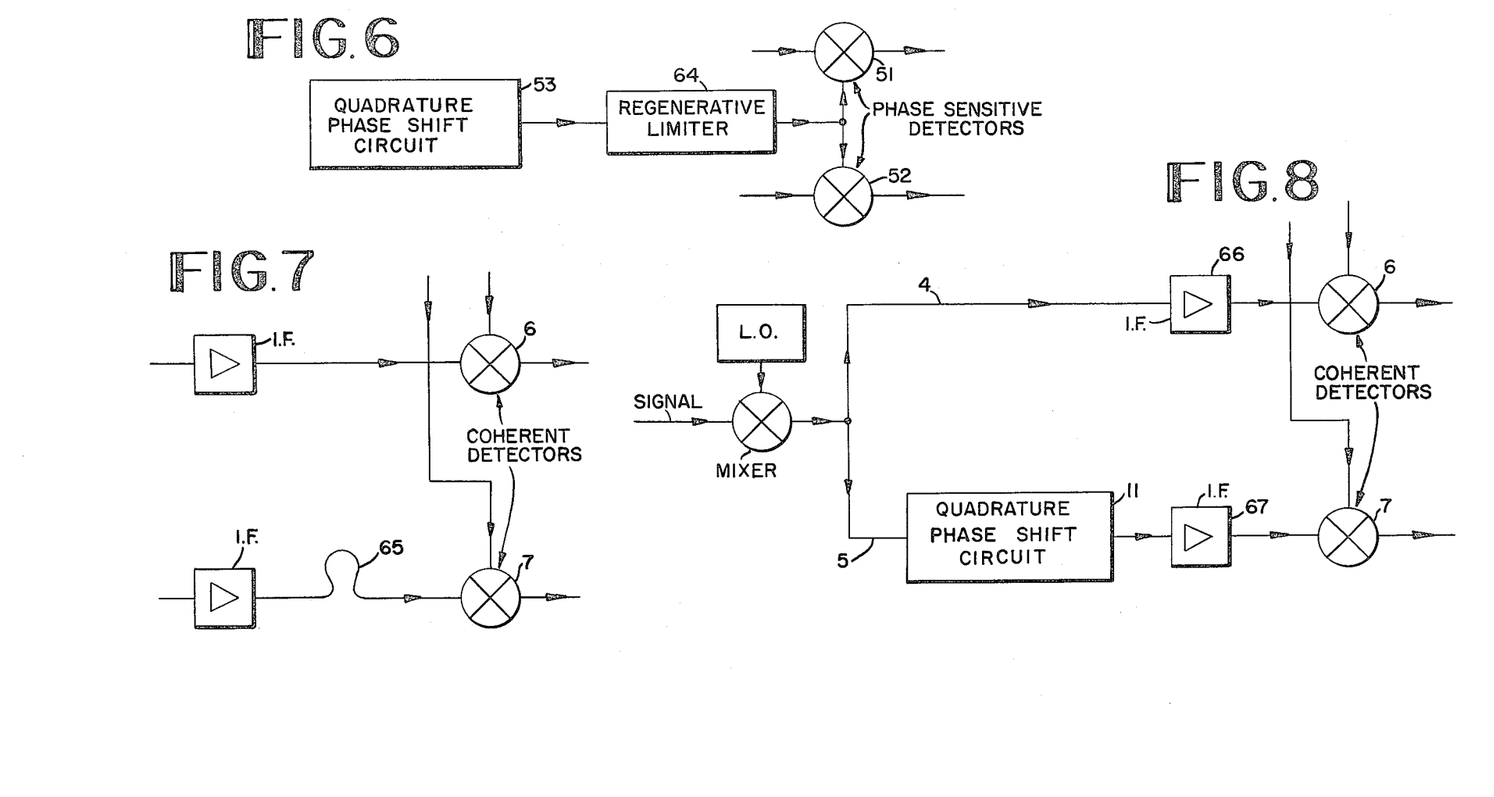

Again the functions of the quadrature phase-shift circuits are to ensure in two receiver channels ((1) sum channel, (2) azimuth and elevation difference channel) a quadrature relation between them before and after the coherent detectors of those channels, and to obtain an overall 180° phase change to enable the sense of any Doppler frequency shift (FIGS. 1 and 2) or of any misalignment information (FIG. 3) to be preserved through the system. The location of the phase-shift circuits is subject to these limitations and is decided by the conventional polarities required for the misalignment signals at the outputs 54 and 55. They could both be placed in the sum channel or both in the two difference channels if no other considerations conflict. Their construction follows conventional techniques appropriate to the frequency of that part of the system in which they are inserted. For instance in the IF section of the receiver the quadrature phase shift circuit can comprise additional cable inserted in the IF cables at the input to the coherent detectors, as shown in FIG. 7, wherein an additional loop 65 of cable is inserted at the input to the detector 7.

Typical sources of unwanted noise in addition to broad-band jamming are:

a. Oscillator (47) break through in the speedgate mixers (45 and 46);

b. Pick-up in the Doppler amplifiers (41, 42, and 43) which operate at low level;

c. Conversion in coherent detectors (38, 39 and 40) of frequency or amplitude modulation on reference signal $f1$;

d. Intermodulation of modulated clutter in coherent detectors (38, 39 and 40);

e. Demodulation of components at IF present in RF mixers in the receiver (32)

f. Pick-up in IF amplifiers in the receiver (32).

Source (a) is very important when crossing targets are being tracked as it may cause the aerials to be slewed off the target.

The effect of noise from the sources (a) to (e) is reduced as long as the first quadrature phase shift is inserted before the coherent detectors (38, 39 and 40), although to reduce the effect of noise from the source (f) it should be inserted in front of the I.F. amplifiers of the receiver (32). This is shown for a general case in FIG. 8, where I.F. amplifiers 66 and 67 feed the coherent detectors 6 and 7 respectively and the quadrature phase shift circuit 11 is provided at the input of the I.F. amplifier 67.

As a practical matter, the sign of the phase shift needed depends upon whether an incoming or outgoing target is tracked and whether the R.F. local oscillator in the receiver (32) is above or below the transmitter frequency - the phase change of the Doppler frequency beat reverses in sign accordingly as the frequency of IF reference signal lies above or below that of the sum and difference IF signals.

I claim:

1. A Doppler radar system, wherein a phase-sensitive detector demodulates a Doppler signal derived from an incoming signal from a moving target, the detector using a reference signal of the same frequency as the Doppler signal, comprising a transmitter, a phase sensitive detector for demodulating a Doppler signal, two coherent incoming signal detectors each fed with reference signal from the transmitter and via divided paths with the same reflected incoming signals from a target, two Doppler signal feed paths, one feeding a Doppler signal from one coherent detector to the signal input of the phase sensitive detector and the other feeding a Doppler signal from the other coherent detector to the reference input of the phase sensitive detector, phase shift means connected in the incoming signal path to one of the coherent detectors for introducing a quadrature phase shift between the two incoming signals applied to the coherent detectors and, further phase shift means connected in one of the feedpaths to the phase sensitive detector for introducing a further quadrature phase shift between the Doppler signals fed to the phase sensitive detector, whereby unwanted Doppler frequency double sideband signals in the outputs of the coherent detectors due to noise modulated transmitter signals mixed with the incoming signals result in opposing signals in the output of the phase sensitive detector.

2. A Doppler radar system as claimed in claim 1, wherein
switching means are provided for switching the first-mentioned phase shift means into a chosen incoming signal path.

3. A Doppler radar system as claimed in claim 1, wherein
switching means are provided for switching the further phase shift means into a chosen feedpath.

4. A Doppler radar system as claimed in claim 1, wherein
speedgate means are provided between the coherent detectors and the phase sensitive detector in which
speedgate mixers having a common speedgate oscillator change the frequency of the Doppler signals and
narrow band fixed-frequency speedgate amplifiers pass the resulting signals to the phase sensitive detector.

5. A Doppler radar system as claimed in claim 4, wherein
automatic gain control means in that one of the speedgate amplifiers connected to the signal input of the phase sensitive detector is controlled by a signal fed back from the output of the phase sensitive detector.

6. A Doppler radar system as claimed in claim 4, wherein
two auxiliary mixers receive outputs from the speedgate amplifiers,
the mixers having a common oscillator operating at speedgate amplifier frequency, and
low pass filters feed the outputs of the auxiliary mixers to
signal and reference inputs of an auxiliary phase sensitive detector,
a differentiator circuit being connected in one of the inputs of the auxiliary detector.

7. A Doppler radar system as claimed in claim 6, wherein
a control path connects the output of the auxiliary phase sensitive detector to control the frequency of the speedgate oscillator.

8. A Doppler radar system as claimed in claim 1 wherein
a radar receiver comprises
a multi-horn aerial receiver having
a sum and
a difference channel,
the sum channel constituting the incoming signal path to the aforesaid other coherent detector and the difference channel constituting the incoming signal path to the aforesaid one coherent detector.

9. A Doppler radar system as claimed in claim 8, wherein
a second difference channel is provided,
a third coherent detector is fed from the second difference channel, and
a second phase sensitive detector having the same reference signal source as the first phase sensitive detector is connected at its signal input to the output of the third coherent detector,
the phase of the second difference channel being the same as that of the first.

10. A Doppler radar system as claimed in claim 8, wherein a limiter is connected in the phase sensitive detector reference signal source.

11. A Doppler radar system as claimed in claim 10, wherein the limiter is a regenerative limiter.

12. A Doppler radar system as claimed in claim 1, wherein the coherent detectors operate at intermediate frequency and the first mentioned phase shift means is, or are, located on the input side of the I.F. amplifier, or amplifiers.

13. A Doppler radar system as claimed in claim 1, wherein the coherent detectors operate at intermediate frequency and the first-mentioned quadrature phase shift means comprises predetermined lengths of connecting cable at the inputs of the coherent detectors.

14. A Doppler radar system of the kind in which a phase sensitive detector demodulates a Doppler signal using a reference signal at the same frequency as the Doppler signal, comprising
two matched coherent detectors,
means for feeding the said two matched coherent detectors with incoming signals from a moving target,
means for feeding the said two matched coherent detectors with the radar system transmitter signal as a reference signal,
a phase sensitive detector,
means for feeding the phase sensitive detector with the separate outputs of the said two coherent detectors,
quadrature phase shift means connected between the signal input channel and one of the two coherent detectors, and
further quadrature phase shift means connected between one of the two coherent detectors and the phase sensitive detector.

15. A Doppler radar system of the kind which comprises a first coherent detector connected to detect a Doppler signal from an incoming signal reflected by a moving target, the said first coherent detector deriving its reference signal from the radar transmitter, and a phase sensitive detector demodulates the Doppler signal, its reference signal being of the same frequency as the Doppler signal and being obtained from the incoming signal by a second coherent detector having the same reference signal as the said first coherent detector; and further comprising
a first quadrature phase shift means connected between the input signal channel and one of the two said coherent detectors and
a second quadrature phase shift means connected between one of the said coherent detectors and the said phase sensitive detector.

* * * * *